Jan. 9, 1934.    J. P. SPANG    1,942,985
MEAT SLITTING MACHINE
Filed Feb. 10, 1933    2 Sheets-Sheet 2

Inventor.
Joseph P. Spang
by Heard Smith & Tennant.
Attys.

Patented Jan. 9, 1934

1,942,985

UNITED STATES PATENT OFFICE 1,942,985

MEAT-SLITTING MACHINE

Joseph P. Spang, Quincy, Mass.

Application February 10, 1933. Serial No. 656,051

3 Claims. (Cl. 17—27)

This invention relates to meat-slitting machines of the type which are provided with a turntable on which the meat is supported, a gang of slitting knives and means to move the knives in one direction over the turntable thereby to cut a series of slits in the meat and then to turn the turntable and move the knives back to their initial position by which backward movement a second series of slits are cut in the meat at right angles to the series of the first slit.

The object of the present invention is to provide an improved means for automatically operating the turntable and also improved means for yieldingly holding the stripper plate against the meat during the slitting operation.

Figure 1:
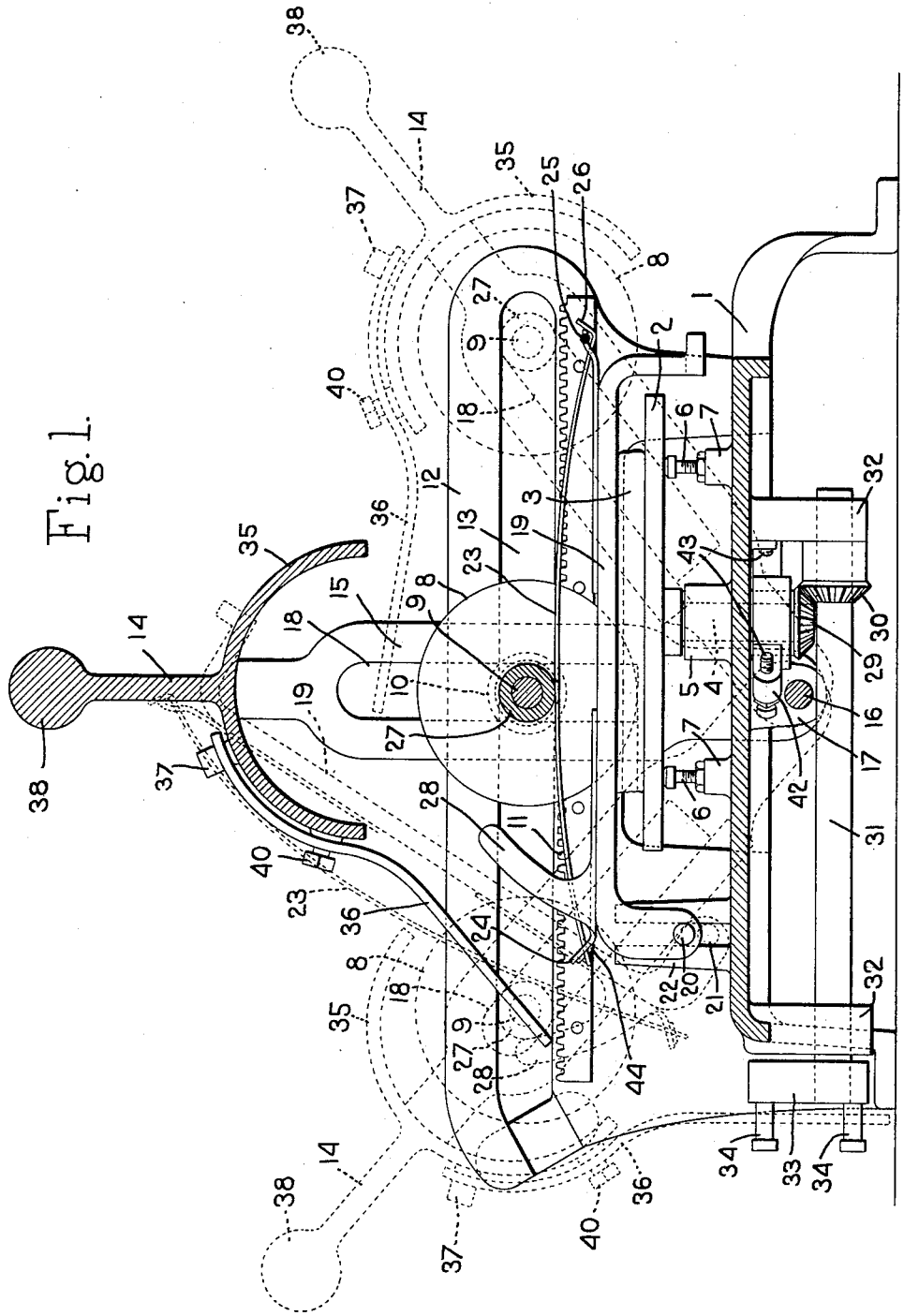
Fig. 1 is a sectional view through a meat-slitting machine embodying my invention taken on the line 1—1, Fig. 2.

The machine herein shown comprises a frame 1 on which is mounted a meat-supporting table 2 that is turnable about a vertical axis and on which the slice of meat 3 to be slit is supported.

The turntable 2 is shown as provided with a vertical spindle 4 which is journalled in a boss or bearing 5 with which the frame is provided. Said turntable is supported on levelling screws 6 which are screw threaded into bosses or projections 7 on the frame, said screws serving both as a support for the turntable 2 and as a means for levelling up the turntable.

The slits in the meat are formed by a gang of rotary slitting knives 8 herein shown as mounted on a shaft 9. The knives are mounted to move back and forth across the turntable and to be rotated while so moving. For this purpose the shaft 9 has fast thereon a pinion 10 which meshes with a rack 11 that is secured to one of the side portions 12 of the frame. These side portions 12 are provided with slots 13 through which the shaft 9 extends, said slots constituting guiding means which guides the knives with a straight line movement as they are moved back and forth across the meat.

The knives are given their slitting movement through the medium of a knife-actuating member 14 in the form of a yoke, the arms 15 of which embrace the side portions 12 of the frame and are mounted on a rock shaft 16 extending transversely of the frame at the lower part thereof and journalled in suitable bearings 17. The upper end of this knife-actuating member 14 is formed with a handle 38 by which it can be swung from the left hand dotted line position Fig. 2 to the right hand dotted line position, said knife-actuating member being shown in full lines in Fig. 1 in a midway position.

The legs 15 of this knife-actuating member are provided with slots 18 through which the shaft 9 extends and hence swinging movement of the knife-actuating member from one dotted line position to the other will move the knives across the turntable. During this movement the meshing of the pinion 10 with the rack 11 will cause the knives to rotate rapidly so that they will slit the meat with a shearing or drawing cut.

As will be understood the construction is such that the cutting edges of the knives are spaced slightly from the turntable so that the knives will cut slits nearly but not quite through the slice 3 of the meat.

The meat is retained on the turntable during the meat-slitting operation by means of a hold-down member 19 in the form of a grid which has slots 49 through which the knives extend. This hold-down member is provided at one end with laterally-projecting pins or trunnions 20 that are received in slots 21 formed in thickened portions 22 of the sides 12 of the frame. This grid or hold-down member 19 is yieldingly pressed against the meat during the meat-slitting operation through the medium of two leaf springs 23. The left hand end of each spring 23 extends loosely through an opening in a projection 24 extending from the grid member and the right-hand end of each spring extends loosely through an opening in another projection 25 extending from the right-hand end of the hold-down member 19. A cotter pin 44 extends through the left hand end of each spring.

The right hand end of each spring member is shown as bent upwardly at 26, said upwardly bent end by its engagement with the finger 25 assisting in holding the spring in position.

As the knife-actuating member is moved from one dotted line position to the other the rolls 27 which are loosely mounted on the shaft 9 engage the springs 23 as shown by full lines Fig. 1 and serve to flatten said springs somewhat thereby placing the springs under tension and applying a yielding pressure to the hold-down member 19. The fact that the ends of the springs pass loosely through the openings in the projections 24 and 25 permit said springs to flatten without cramping the parts.

Means are provided for raising the hold-down member from the meat at the end of each backward stroke and this is accomplished by providing the hold-down member with the upstanding fingers 28 with which the shaft 9 comes in engagement before the knife-actuating member has had its full stroke toward the left in Fig. 1. The engagement of the shaft 9 with these fingers 28 during the final portion of the backward stroke of the actuating member 14 serves to rock the hold-down member 19 about the trunnions 20 as an axis and to throw said member into the dotted line position in Fig. 1, thereby raising it from the turntable. When the parts are in this position an unslit slice of meat may be readily placed on the turntable or a slit slice of meat may be removed from the turntable.

Means are herein provided whereby during the final backward movement of the knife-actuating member 14 into its left hand dotted line position Fig. 1 and after the hold-down member 19 has been raised from the meat, the turntable 2 will be automatically turned through a quarter revolution.

The spindle 4 of the turntable is provided at its lower end with a bevelled gear 29 which meshes with another gear 30 on a shaft 31 journalled in bearings 32 carried by the frame. The rear end of this shaft 31 is provided with a head or cross piece 33 carrying two pins or projections 34.

The knife-actuating member 14 is provided with a knife guard 35 to which a bunter member 36 is pivotally mounted at 37. This bunter is shown as having a slot 39 therein through which extends a bolt 40, said bolt serving to limit the swinging movement of the bunter 36 about its pivot 37. The lower end of the bunter is formed with an indentation which presents two inclined surfaces 41, each of said surfaces extending inwardly and upwardly from the outside edges of the bunter to a central meeting point.

Figure 2:
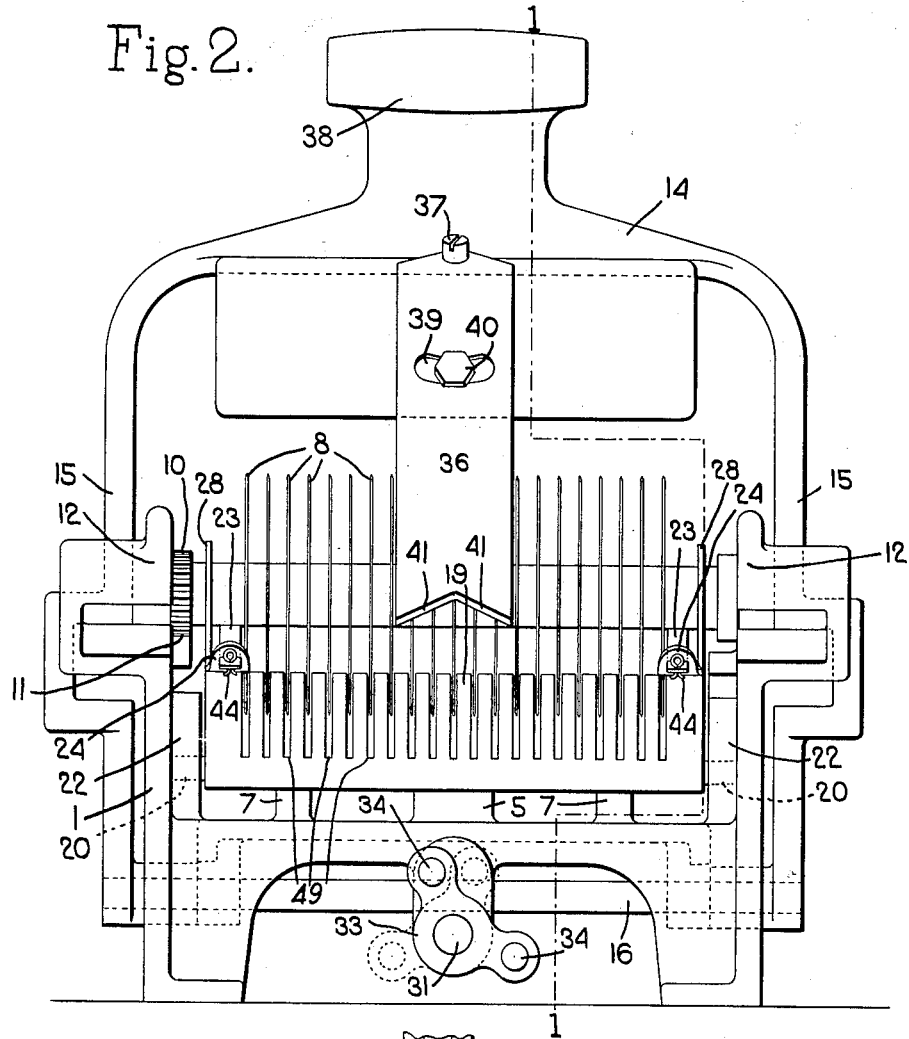
Fig. 2 is an end view of the machine looking from the left in Fig. 1.
Figure 3:
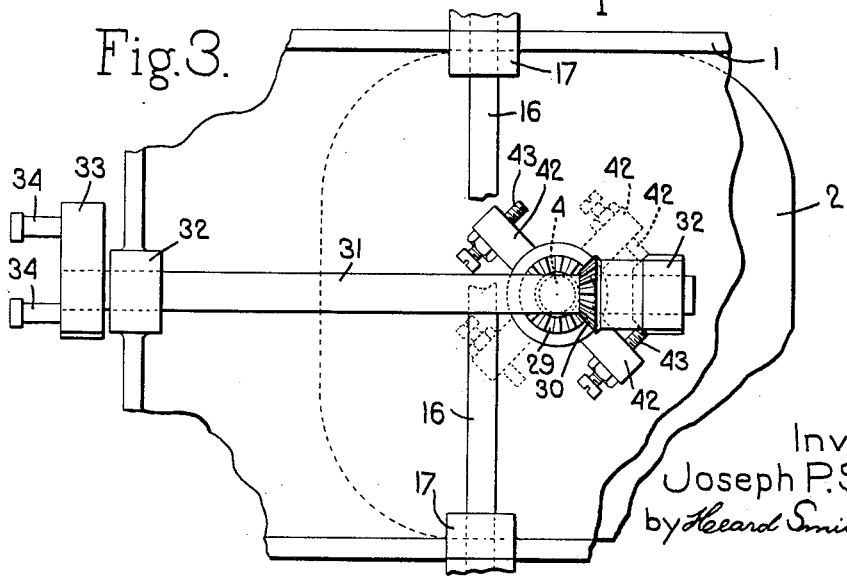
Fig. 3 is a fragmentary view showing the turntable-operating device.

Assuming the parts are in the full lines in the drawings the indented end of the bunter will engage the uppermost pin 34 during the final movement of the knife-actuating member into the left hand dotted line position Fig. 1 and such engagement will rock the head 33 from the full to the dotted line position in Fig. 2, thereby moving one pin 34 from the upper to the lower position and carrying the other pin from its lower to its upper position. This operation will give the shaft 31 a quarter revolution which will operate through the gears 29, 30 to turn the turntable a quarter revolution. Such turning of the turntable occurs after the hold-down member has been raised from the meat.

When the knife-actuating member makes its next backward movement the indented end of the bunter will engage the pin which is in the uppermost position as shown by the dotted line in Fig. 2, so that during the final movement of said member the turntable will be given a reverse quarter turning movement.

The width of the bunter and the indented end thereof is sufficient so that it will engage either pin 34 when it is in its raised position. During the movement of the bunter while it is in contact with the pin moving said pin from its upper to its lower position, the bunter will have a lateral swinging movement due to the arcuate bunter-actuating movement of the pin. The pivoted mounting of the bunter, however, allows such movement without cramping the parts.

I claim:

1. In a meat-slitting machine, the combination with a meat-supporting turntable, of a gang of rotary slitting knives, a swinging knife-actuating member to move the knives across the turntable thereby to form the slits in the meat thereon, a rocking member operatively connected to the turntable and means carried by the knife-actuating member to rock said rocking member alternately in opposite directions during the final portion of successive movements of the knife-actuating member in the same direction.

2. In a meat-slitting machine, the combination with a meat-supporting turntable, of a gang of rotary slitting knives, a swinging knife-actuating member to move the knives across the turntable thereby to form the slits in the meat thereon, a rocking shaft connected to said turntable, a head on the rock shaft having two pins and a bunter carried by the knife-actuating member and adapted to engage said pins alternately during the final portion of successive movements of said knife-actuating member in the same direction, thereby to turn the turntable first in one direction, then in the other.

3. In a meat-slitting machine having a meat-supporting table, a gang of rotary knives, a shaft on which said knives are mounted, means for moving said knives across the table with a right line movement, means to rotate the knives during their right line movement, a hold-down member, and a leaf spring engaging said hold-down member at its ends and the intermediate portion of which is acted on by the shaft of the rotary knives during the meat-slitting movement of said knives, whereby the hold-down member is yieldingly held against the meat.

JOSEPH P. SPANG.